Nov. 20, 1928.                                                1,692,427
W. E. URSCHEL
ICE CREAM CUTTING AND COATING MACHINE
Filed July 12, 1924          3 Sheets-Sheet 1

William E. Urschel Inventor

N. S. Amstutz

By

Attorney

Nov. 20, 1928.  W. E. URSCHEL  1,692,427
ICE CREAM CUTTING AND COATING MACHINE
Filed July 12, 1924  3 Sheets-Sheet 2
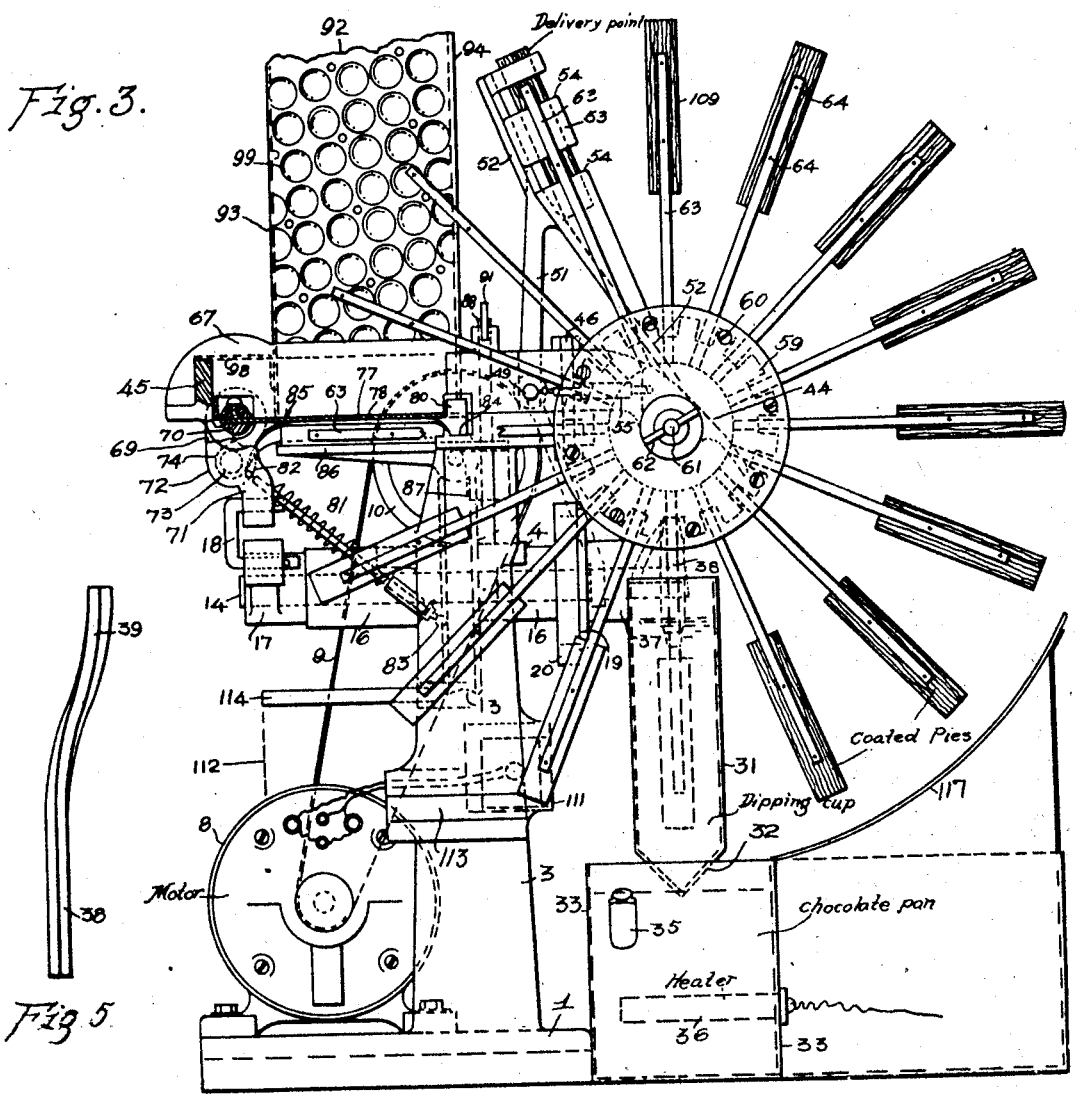
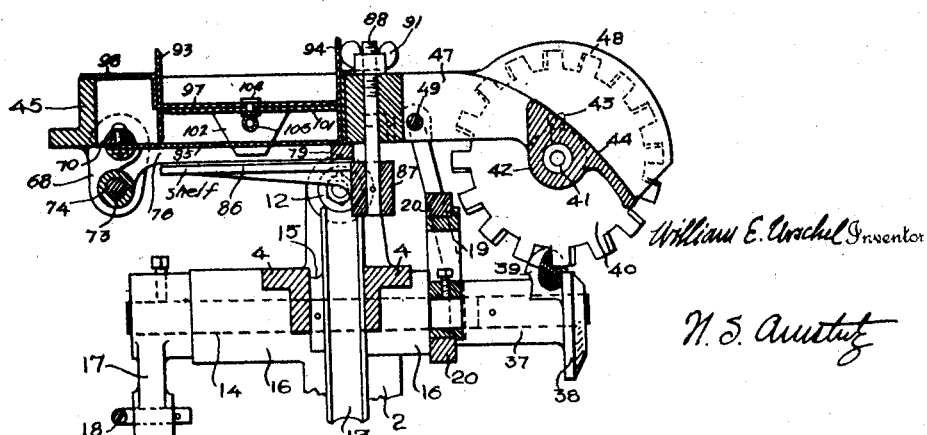

Nov. 20, 1928.　　　　　W. E. URSCHEL　　　　　1,692,427
ICE CREAM CUTTING AND COATING MACHINE
Filed July 12, 1924　　　3 Sheets-Sheet 3
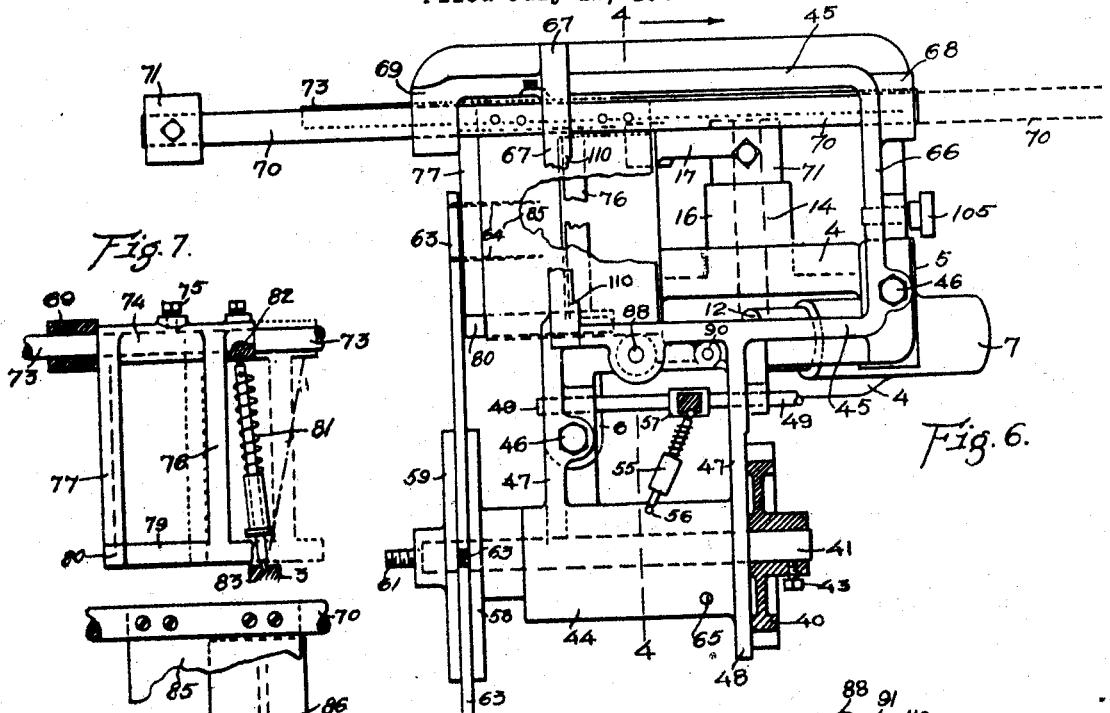
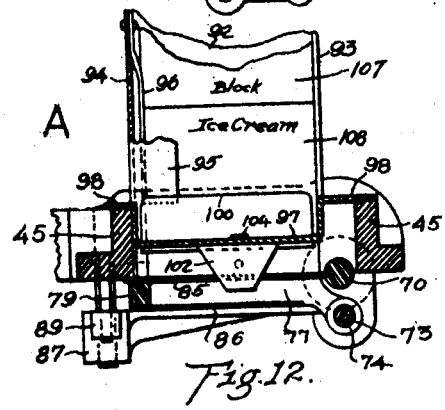
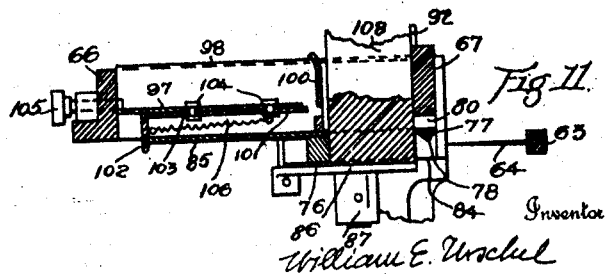
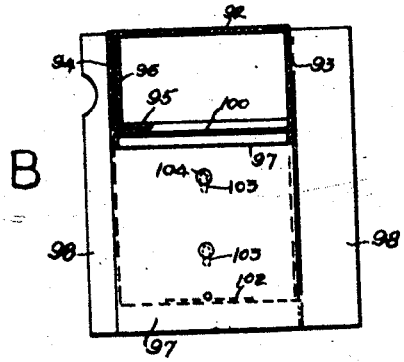
Inventor
William E. Urschel
By N. S. Amstutz
Attorney Patented Nov. 20, 1928.

1,692,427

UNITED STATES PATENT OFFICE.

WILLIAM E. URSCHEL, OF VALPARAISO, INDIANA, ASSIGNOR TO ESKIMO PIE CORPORATION, OF LOUISVILLE, KENTUCKY, A CORPORATION OF DELAWARE.

ICE-CREAM CUTTING AND COATING MACHINE.

Application filed July 12, 1924. Serial No. 725,734.

My invention relates to improvements in ice cream cutting and coating machines, and it more especially consists of the features pointed out in the annexed claims.

The purpose of my invention is to provide a simplified form of cutting and coating machine of moderate capacity; that is automatic throughout; that intermittently separates a slab of ice cream from an ice cream brick which may feed itself by gravity; that impales the slab onto a pair of needles secured to one of a group of radial arms, all of which are similarly supplied with carrying needles; that moves the portions of ice cream successively into the dipping position where an oscillating cup containing melted chocolate is automatically raised in periodic sequence so as to immerse the portions of ice cream into the chocolate to coat them; and that after the coating, successively moves the product upward to a delivery position where it is automatically detached from the carrying needles and passed on by gravity to an operator to be wrapped. A further purpose is to provide a machine of small compass so as to be operated on any suitable table without the necessity of providing an elaborate stand or base.

With these and other ends in view, I illustrate in the accompanying drawing such instances of adaptation as will disclose the broad underlying features without limiting myself to the specific details shown thereon and described herein.

Fig. 3 is a rear elevation of Fig. 1.

Fig. 4 is an elevation in section on line 4—4 of Fig. 6 showing the related parts as though none of them were positioned at an angle, as instanced in Fig. 1.

Fig. 5 is a developed diagrammatic plan view of the periphery of the combined driving worm and cam.

Fig. 6 is a top plan view of the upper portion of the machine partly duplicating in outline Fig. 2.

Fig. 7 is a detached top plan view of the carrier frame.

Figure 1:
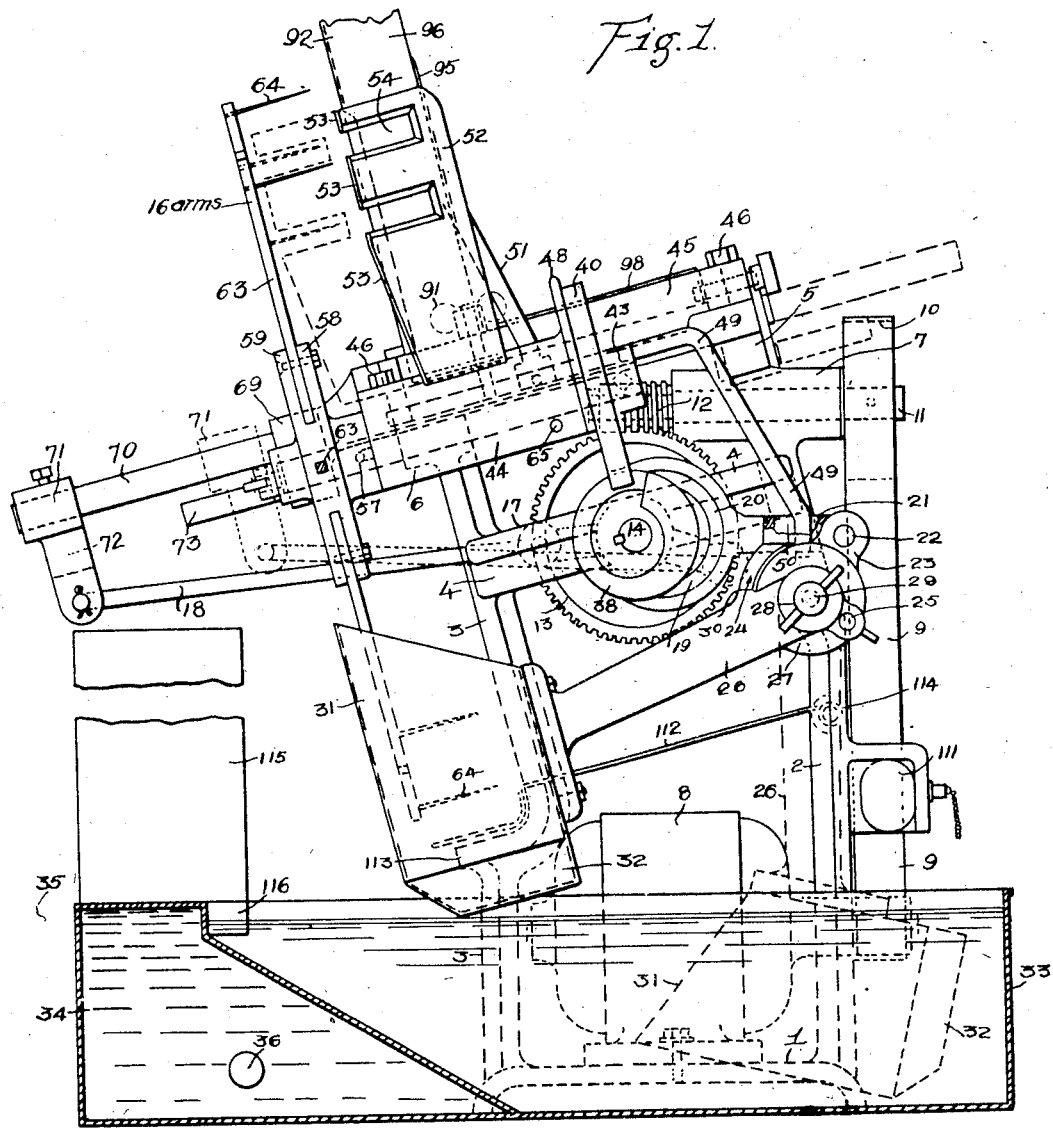
Figure 1 is a side elevation of the device partly in section showing the parts in the dipping relation.

Fig. 8 in a detached top plan view of the supporting shaft.

Fig. 9 is an elevation in cross section showing a slab of ice cream being impaled on the carrying needle.

Fig. 10 is a view similar to Fig. 9 showing the carrier frame retracted and the knife still in position under the brick of ice cream.

Fig. 11 is a view similar to Figs. 9 and 10 showing the brick of ice cream lowered into its severing position by gravity with the knife and its guard plate retracted.

Fig. 12, A, is a front elevation of the feeding magazine; and Fig. 12, B, is a plan view partly in section of Fig. 10.

In practically carrying out my invention, I may use various alternative constructions in the arrangement of parts of the supporting frame and substitutionary expedients in the various cooperating parts which function together to successively cut slabs from the end of an ice cream brick, push the slab onto needles which project from the radial arms of a Ferris wheel, to automatically coat the slabs of ice cream with chocolate and deliver the coated product, after the chocolate has set, to a suitable delivery chute, not shown, ready for wrapping.

Without reference to specific details, the functions of the machine may be briefly described as comprising a main drive shaft provided with a pulley at one end and a worm at the other end. The worm meshes with a worm gear beneath it that is secured to a transverse shaft which at the right hand end is provided with a crank for operating the severing knife and at the left hand end with an eccentric for operating the dipping and delivery mechanism. In addition, at the left hand end, a combined cam and worm is secured which periodically moves the Ferris wheel and its attached shaft to a new position and between such movements holds the Ferris wheel firmly locked in position while a severed slab of ice cream is pushed onto the needles of one of the radial arms of the Ferris wheel. Each complete revolution of the Ferris wheel also completes the delivery of sixteen finished chocolate coated ice cream "pies."

It is obvious that the various inter-related functions may be carried out by means of different expedients providing that the various functions be properly coordinated in their time relation with respect to each other so that the ice cream brick drops onto a supporting shelf after the severing knife has been withdrawn, and that on the partial completion of the forward movement of the severing knife the detached slab of ice cream is pushed forward by the further and final forward movement of the severing knife onto the needles of the Ferris wheel. During the same time a previously impaled slab of ice cream is being coated with a layer of liquid chocolate, and in addition another slab of ice cream on which the previously dipped chocolate has become set is automatically pulled off from the carrying needles as a finished product.

The present exemplification of my invention comprises a main frame having a base 1 on which there is a front standard 2 and a rear standard 3. Near the upper end of these standards they are joined by cross members 4 which form a slot between such cross members for worm gear 13. At the top of the standards 2 and 3 supporting bosses are formed, a boss 5 on the front standard 2 and a boss 6 on the rear standard 3. These bosses support the upper frame 45 which is held thereon by suitable cap screws 46. Below the supporting boss 5 the bearing 7 is located on the standard 2 which bearing accommodates the main driving shaft 11 that has a pulley 10 secured to its outer end and a worm 12 at its inner end. This worm meshes with the worm gear 13 and it serves to thereby rotate the transverse shaft 14 which shaft revolves in bearing 16 which projects from the cross members 4 as shown in Fig. 4. The right hand end of the shaft 14 has secured thereon a crank 17. Between the members 4 the worm gear 13 is mounted on the shaft 13 within the slot 15 formed by the members 4. At the extreme left hand end of the shaft 14 a combined cam and worm is secured. This worm has a hub 37 into which the shaft 14 projects and between this hub and the bearing 16 an eccentric 19 is secured to the shaft. On this eccentric an eccentric strap 20 is placed.

The crank 17 is joined to the knife operating rod 70 by a connecting rod 18 which is pivoted to a short drop arm 71 attached to the extreme rear end of the rod 70. The purpose of this crank as already stated is to move the severing knife to and fro. The movement of the severing knife 85 in a cutting direction first cuts off a slab of ice cream from the bottom end of the ice cream brick 108 leaving the cut-off portion beneath the knife and resting on the shelf 86 while inclosed by the cross bars 76 and 77 of the carrier frame 74. The further movement of the knife 85 causes its cutting edge to engage a projection 80 formed at the junction of the members 77 and 79 of the carrier frame 74 (see Figs. 7 and 9) which pushes the carrier frame with its inclosed ice cream slab 109 in the direction of the carrying needles 64 and thus impales the portion of ice cream onto a pair of these needles as shown in Fig. 9.

The return movement of the knife 85 attached to the rod 70 first withdraws the knife 70 from under the ice cream brick and also, through the engagement of the depending arm 71 with the carrier frame rod 73, returns the carrier frame to its initial or first position, ready to receive the lower end of the ice cream brick as it drops into the frame opening by gravity as shown in Fig. 10. In order that the ice cream brick will not start to drop immediately, a portion of its under surface is exposed by the withdrawal of the knife, a friction plate 100 shown in Figs. 10 and 11, is held against the ice cream by reason of a spring 106 until the knife 85 has been completely removed from beneath the ice cream brick, at which time the non-cutting edge of the knife engages a depending portion 102 of the sliding part 101 which connects the friction member 100 to the depending part 102, and thus moves the part 100 away from the ice cream brick as shown in Fig. 11, to allow the brick to drop onto the shelf 86 beneath carrier frame 74 as shown in Fig. 11.

The carrier frame 74 is mounted on a rod 73 that slides in the lower portion of bearing 68 and 69. A set screw 75 holds the carrier frame secured on the rod 73. As above stated the carrier frame is moved from beneath the ice cream towards the bearing 69 by reason of the cutting edge of the knife 85 engaging the projection 80, and in the opposite direction by reason of a side projection 72 of the short arm 71 engaging the rod 73 after the rod 70 and the arm 71 have traversed a short distance from their extreme outward position toward the bearing 69, as shown in Figs. 1 and 6. The cross member 77 of the carrier frame is beveled on its under side at 78 so as to present a very narrow edge to the ice cream slab 109 and thus prevent the severed portion of ice cream from "freezing" against the cross member 77.

The cross members 76 and 77 are joined together by the portion 79 that is positioned parallel to the rods 70 and 73. The carrier frame 74 is elastically held in its extreme positions of movement by a compression spring 81 whose two-part sliding members respectively have bearing in 74 at 82 and in 83 in the frame standard 3 as shown in Fig. 7. In order that the knife 85 and the carrier frame 74 will be retained in parallel relation to each other so that the knife will have bearing on the upper surface of cross members 76, 77 and joining member 79 of the carrier frame 74, a notch 84 is formed in the frame standard 3 as shown in Figs. 10 and 11, which forms a support for the part 79 to slide on. This is also shown in Fig. 3.

Figure 2:
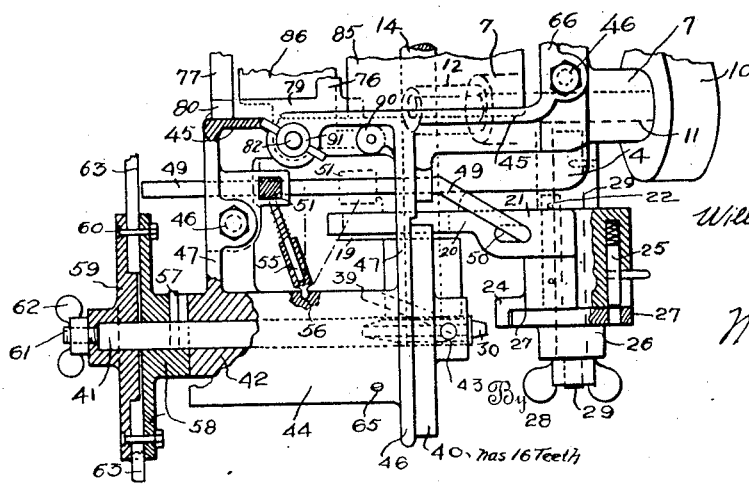
Fig. 2 is a top plan view partly in section of the mechanism for operating the "Ferris wheel" carrier and the delivery mechanism, the main portion of the feeding mechanism being broken away.

A pair of side projections 47 extend sideways from the top frame 45 as shown in Fig. 2. An open surface is formed by these projections in which the delivery arm 51 has movement to and fro while secured on the rod 49. A tension member 55 has one end seated in the bearing 42 at 56 and the other end in a socket of the lower end of the delivery arm 51. The bearing 42 joins the side projections 47, and the front projection 47 is extended upward to form a guard 48 adjacent the coarse meshed worm gear 40. The delivery rod 49 at its front end is bent downward and sideways as shown in Figs. 1 and 2, so as to enter the slot 50 formed in the eccentric arm 21.

In the delivery of the coated portions of ice cream it has been found necessary to give an extra push or kick so that the finished product will not stick against the guard portions 53 of the delivery chute 52. This is accomplished by reason of the tension member 55 being put under maximum compression at its central position shown by means of a dotted center line of Fig. 2. As soon as this point is reached through the depending end of the rod 49 being engaged by the rear edge of the slot 50 the compression of the member 55 accelerates the movement of the rod 49 so as to take up the slack in the slot 50 and thus cause the extra kick to the delivery chute 52.

This chute is provided with slots 54 through which the carrier needles 64 can freely pass while the finished product is on one side of the guard or delivery flanges 53 and the radial arms 63 are on the other side of such flanges. Sometimes during the withdrawal of a finished pie, small knobs of chocolate may be left at the point where the needles are withdrawn, which knobs, if no provision was made for accelerating the movement of the delivery chute through the medium of the tension member 55, might rest on the middle portion of flange 53. The lower end of the chute 52 rests on the beveled portion 44 of the bearing 42 and in the to and fro movement of 52, slides on the part 44.

Reverting to the severing function of the machine, the shelf 86, onto which the ice cream brick drops, is positioned parallel to the cross members 76 and 77 of the carrier frame 74. It has a side extension on which a depending boss 87 is formed, and a right angle extension therefrom terminated in a boss 89. The latter has an up-standing guide pin 90 which has bearing in a boss of the top frame 45, as shown in Figs. 2, 6 and 9. The boss 87 has rigidly secured therein a threaded pin 88 which projects upward through the frame 45 as shown in Figs. 4, 6 and 9, so that an adjusting thumb nut 91 controls the vertical position of the shelf 86.

Change of adjustment of the stem 90 by means of the thumb nut 91 will, within limits, change the thickness of the portion of ice cream that is to be severed from the lower end of the ice cream brick. The upper frame 45 has a front cross member 66 and a rear cross member 67, as shown in Fig. 6. The cross member 67 has edges 110 formed on the front face thereof, which serve as guides for the ice cream feeding trough 92. This trough or "hopper" has side flanges 93 and 94 as shown in Fig. 12, B, and also a narrow front flange 95 joined onto the side flange 94. The rear wall 92 rests on the cross member 67 of the top frame 45, and a supporting base formed of sheet metal is attached to the flanges 93 and 94, as shown in Figs. 9–12 inclusive.

This base consists of a flat portion 97 and angularly formed supporting flanges 98, as especially shown in Fig. 12, A. The flat portion 97 has buttons 104 which form supports for the slide 101, and the slide 101 has limit slots 103 through which the buttons 104 pass. The purpose of these slots is to limit the extent of movement of the slide 101. In order that the ice cream brick will not, under certain circumstances, stick against the back 92, raised portions 99 are formed thereon somewhat as shown in Fig. 3 and Fig. 10. If desired, small air holes may be formed between the slight projections 99, as shown in Fig. 3. In order to hold the ice cream brick against the side flange 93 and also to accommodate different widths of ice cream brick, a flat spring 96 may be secured to the flange 94. A weighted block 107 may be placed on top of the ice cream brick in order to give the added weight if such is found necessary, and a thumb screw 105 shown in Fig. 11 serves to hold the parts 92 to 97 in position on the upper frame 45.

Each of these severed portions of ice cream, as already stated, are impaled on a pair of needles 64 secured to one of 16 separate radial arms 63. These arms are clamped between an inner disk 58 and an outer disk 59 as shown in Fig. 2. These disks are held together by bolts 60. When these disks and arms are assembled they constitute what I have called a "Ferris wheel" which is accurately positioned on the shaft 41, by reason of a pin 57 of the shaft entering a notch formed in the hub of the disk 58. The "wheel" is held on the shaft 41 by means of a thumb nut 62 threaded on the reduced diameter end of the shaft 41. The forward end of shaft 41 has mounted thereon a worm gear 40 and a set screw in the hub of this gear 43 holds the worm gear on the shaft subject to adjustment when the moving parts of the machine are timed. When once adjusted this set screw is not again changed. A hole 65 is formed in the beveled face 44 to hold any desired form of supplementary delivery chute not shown. The worm gear 40 has 16 teeth, the same number as the radial arms 63. It is periodically moved by the angular portion 39 of the worm 37 and after each movement, constituting one-sixteenth of the circumference of the "Ferris wheel" and also of the worm gear 40, the worm gear is held locked by the straight portion 38 of the worm gear.

Instead of moving the cut portions of ice cream into melted chocolate, I reverse this order and raise a cup of the liquid chocolate periodically so as to surround each severed portion of the ice cream with the contents of the cup, immediately thereafter dropping the cup out of the path of movement of the radial arms 63. The cup 31 is provided with a V-shaped bottom 32 which prevents splashing after the cup is lowered into the chocolate of the pan 33. The cup is secured to the oscillating arm 26 which arm has a flange 27 surrounding its pivot end.

A hole is formed in this flange for a spring bolt 25 and the arm 26 has a stop 30 on its upper face which is engaged by the projection 24 of the crank 23. This projection positively moves the arm 26 and attached cup 31 away from the dipping position shown in Fig. 1, and the spring bolt 25 may be retracted so that its handle will drop into a retaining notch shown in Fig. 2, to thereby leave the arm 26 free as shown in dotted lines in Fig. 1. The thumb nut 28 serves to hold the arm 26 and crank 23 on the stud 29. This function is controlled by the eccentric 20 through its arm 21 whose end is pivoted at 22 to the crank 23.

The machine is driven by a motor 8 through a belt 9 and the main driving pulley 10. It is controlled by an operating switch 111, and is protected from any drippings by a plate 112 secured at one end on a supporting rod 114 and at the other end on a projection 113 of the frame standard 3. The chocolate is maintained in liquid condition by means of heated water in the compartment 34, in which water is admitted at the inlet 35 and the temperature of which is maintained by an electric heating element 36. A chocolate supply can 115 rests on top of the water compartment as shown in Fig. 1. It has a nozzle 116 which projects below the normal level of chocolate in pan 33.

An important reason for placing the carrying wheel and the feed mechanism at an angle to the base, is to avoid the drippings of chocolate from one arm falling onto an adjacent arm beneath it which would surely happen if the wheel rotated on a plane perpendicular to the base, and in order to catch such drippings the pan 33 may be extended sidewise as suggested in Fig. 3, or a curved dripping plate 117 may be used if desired.

What I claim is:

1. For sizing of material in block form, a machine comprising means for severing a section of the material from the block, a well for holding a sizing fluid, means for separating a portion of the sizing fluid from the main body thereof, and means cooperating with said separating means to effect the enveloping application of said separated portion of sizing fluid to the severed section of block material.

2. A machine as defined in claim 1, and in which said means for separating a portion of the sizing fluid is adapted to withdraw such separated portion from said well and to lift said separated portion about said severed section of said block material.

3. A machine as described in claim 1, and in which said fluid separating means comprises a dipper, and means for periodically inserting said dipper in said well and for lifting the separated portion of such sizing fluid about the severed section of block material.

4. A machine for sizing material in block form which comprises a rotatable member having holding needles at regular intervals thereon, means for cutting sections of material from the block thereof and impaling said sections on said needles, a well for containing the liquid for sizing the block material, and means for withdrawing a portion of said liquid and applying said portion around one of said sections of block material.

5. A machine as described in claim 4, and in which said cutting means comprises a knife adapted to sequentially sever sections of said block at one station, and said rotatable member is adapted to be advanced a predetermined distance toward said station to receive said severed sections of said block.

6. A machine as described in claim 4, and in which said cutting means comprises a knife adapted to sequentially sever sections of said block as successive sets of impaling needles are presented thereto, said knife including means for forcing the severed sections of said block upon said sets of impaling needles.

7. A machine as described in claim 4, and having means for withdrawing said sized material from said holding needles.

8. A machine for sizing material in block form which comprises a Ferris wheel having spokes, and impaling needles secured to the extremity of the spokes, means for severing a section of said block and impaling said section on a set of needles, a well for holding sizing liquid, means for withdrawing a portion of said liquid and enveloping said section therewith, and means for automatically removing the sized sections and depositing them in a conveyer chute.

9. A machine as described in claim 8, and having means for intermittently rotating said Ferris wheel predetermined distances, and means for locking said wheel in a stationary position to admit of said impaling, sizing and removing means functioning simultaneously at different sections of said wheel.

10. A machine for sizing material in block form which comprises a Ferris wheel having spokes and impaling needles secured near the outer extremity of said spokes, a knife for severing sections from said block, said knife designed to sever a section of block and force the severed sections onto a set of impaling needles in one continuous operation, a well for containing sizing liquid, a dipper for withdrawing a portion of the liquid and enveloping one of the impaled sections therewith, means for withdrawing the sized sections, and synchronizing means whereby the Ferris wheel is alternately rotated a distance equal to the distance between the sets of impaling needles and held against rotation intermediate successive movements, the severing and impaling, sizing and removing steps occurring simultaneously while said Ferris wheel is held against rotation.

In testimony whereof I affix my signature.

WILLIAM E. URSCHEL.